United States Patent [19]
Leshem

[11] Patent Number: 5,523,851
[45] Date of Patent: Jun. 4, 1996

[54] VIDEO RECORDER HAVING TIME WINDOW GENERATING CIRCUITRY

[75] Inventor: Pawel Leshem, Biedermannsdorf, Austria

[73] Assignee: U.S. Philips Corporation, New York, N.Y.

[21] Appl. No.: 236,978

[22] Filed: May 2, 1994

[30] Foreign Application Priority Data

May 26, 1993 [AT] Austria ................................. 1030/93

[51] Int. Cl.[6] .......................... H04N 5/76; H04N 5/765; H04N 5/77
[52] U.S. Cl. .................... 358/335; 358/310; 348/705; 348/706
[58] Field of Search ................................. 358/335, 310; 360/61; 348/705, 706

[56] References Cited

U.S. PATENT DOCUMENTS

| 4,267,563 | 5/1981 | Sato et al. | 358/127 |
| 4,272,784 | 6/1981 | Sato et al. | 358/127 |
| 5,032,926 | 7/1991 | Imai et al. | 358/335 |
| 5,099,364 | 3/1992 | Kawabata | 358/335 |

FOREIGN PATENT DOCUMENTS

| 52-69520 | 6/1977 | Japan | 358/335 |
| 1-218231 | 8/1989 | Japan | 358/335 |
| 233203 | 8/1994 | Japan . | |
| 268956 | 9/1994 | Japan . | |
| 282893 | 10/1994 | Japan . | |

*Primary Examiner*—Tommy P. Chin
*Assistant Examiner*—David R. Vincent
*Attorney, Agent, or Firm*—Edward W. Goodman

[57] ABSTRACT

In a video recorder (2) with a tuner (20a), with a recording and playback device (34), with a connector (4) to which a television receiver (3) can be connected, with a mode selection device (65) for selecting the "recording" mode, the "playback" mode and further modes of operation, and with a control signal generator (73) for generating a playback control signal (V(Pb)) when the video recorder (2) is in the "playback" mode, the video recorder (2) further includes a time window generator (105) for generating a time window of a given time window length (T), this time window generator being controlled by the mode selection device (65) in such a manner that the time window generator (105) generates a time window as a result of the initiation of the activation of at least one given mode, the time window generator (105) activating the control signal generator (73) for the duration of the time window length (L) of the time window.

4 Claims, 3 Drawing Sheets

VIDEO RECORDER HAVING TIME WINDOW GENERATING CIRCUITRY

BACKGROUND OF THE INVENTION

1. Field of the Invention

The invention relates to a video recorder having a tuner which can be tuned to each time one station of a plurality of stations and, after it has been tuned to a station, supplies a received television program signal, having a recording and playback device for recording a received television program signal supplied by the tuner and for reproducing a recorded television program signal, and having a connector which can be connected to the tuner for applying to said connector the received television program signal supplied by the tuner, to which connector a cable can be connected, which cable can also be connected to a connector of a television receiver, said television receiver also having a tuner which can be tuned to each time one station of a plurality of stations and, after it has been tuned to a station, supplies a received television program signal, which is reproduced by the television receiver in a first reproduction mode thereof, the cable enabling signals to be transferred away from the video recorder and to the video recorder, and having a mode selection device by means of which the video recorder can be set to a "recording" mode, in which a received television program signal supplied by the tuner is recorded, to a "playback" mode, in which a recorded television program signal is reproduced, and to further modes of operation, and having a control signal generator, which generates and supplies a playback control signal when the video recorder is in the "playback" mode, which playback control signal together with a television program signal reproduced in the "playback" mode in the video recorder can be applied to the connector of the video recorder, from which the playback control signal can be applied to a detection device of the television receiver via the cable and the connector of the television receiver, said detection device being adapted to detect the playback control signal, in said television receiver, a second reproduction mode can be started upon detection of the playback control signal to reproduce a television program signal transferred to the television receiver via the cable.

2. Description of the Related Art

Such a video recorder is generally known in a multitude of versions. For example, such a video recorder manufactured by the Applicant has been marketed under the type number VR 813. Such a video recorder can form a video system comprising a television receiver and this video recorder; the television receiver and video recorder may be constructed as separate units or may be combined to form a single unit. In such a video system, the tuner of the television receiver and the tuner of the video recorder are frequently tuned to different stations transmitting different television programs, i.e., different television program signals, so that in the more frequently used first reproduction mode of the television receiver, which is intended for displaying the television program signal on the display screen of the television receiver, the television program signal supplied by the tuner of the television receiver is displayed on the display screen of this receiver, while, at the same time, the television program signal supplied by the tuner of the video recorder can be recorded by means of the video recorder when the "recording mode" of the video recorder is started. Then the problem arises that if the "recording" mode of the video recorder is started without first having checked whether the tuner of the video recorder has actually been tuned to the television program the user wishes to record and consequently supplies the desired television program signal, it may occur that the tuner of the video recorder has been tuned to another than the desired television program, in which case a television program which is not desired by the user is recorded. However, in order to enable such a check to be performed, the known video recorder requires an intricate operation, which is undesirable and inconvenient. For example, the tuner of the television receiver should first be set to the same station to which the video recorder has been tuned, after which the received television program can be monitored on the display screen of the television receiver. Moreover, the user often wishes to have a possibility to check, during recording of a television program signal corresponding to one television program and the simultaneous display of another television program on the screen of a television receiver, whether the television program signal corresponding to the desired television program is still being recorded by the video recorder or whether, for whatever reason, the desired television program has already ended or has been interrupted or the like. The known video recorder also requires an intricate operation, which is undesirable and inconvenient. Also in the case of, for example, a video recorder which has been set to a so-called stand-by mode, a user often wishes to have, a possibility of simply ascertaining to which station the tuner of the video recorder has been tuned. For this the known video recorder also requires an intricate operation, which is undesirable and inconvenient.

SUMMARY OF THE INVENTION

It is an object of the invention to mitigate the above problems and to provide in a video recorder of the type defined in the opening paragraph a simple and cheap possibility of checking the tuning condition of the tuner of the video recorder, i.e., of checking to which station the tuner of the video recorder has been tuned and which television program signal the tuner consequently supplies. To this end the invention is characterized in that the video recorder has a time window generator for generating a time window of a given time window length, and in that the mode selection device controls the time window generator in such a manner that the time window generator generates the time window of the given time window length at least one time as a result of the initiation of the activation of at least one given mode which deviates from the "playback" mode and which can be activated by means of the mode selection device, and in that the time window generator controls the control signal generator in such a manner that the control signal generator also generates and supplies the playback control signal if the time window generator generates the time window. In this way, it is achieved in a particularly simple manner that by merely starting the actuation of a given mode of operation, the playback control signal, which is generated by means of the control signal generator of the video recorder during a given time interval, is supplied to the television receiver for the given time interval, i.e., the time window length of the time window, so that the television receiver is set to its second reproduction mode and, consequently, the television program signal supplied by the video recorder and transferred to the television receiver via the connector means of the video recorder, the cable and the connector means of the television receiver is reproduced partly on the display screen and partly with a loudspeaker of the television receiver, thereby enabling this television program signal to be monitored visually and acoustically.

The generation of the time window can be effected, for example, when the "stop" mode in the video recorder is selected, i.e., upon actuation of a stop key on the video recorder or on a remote control device for the video recorder. It has proved to be advantageous if, in response to the initiation of the activation of the "recording" mode, the mode selection device activates the time window generator to generate the time window. This is advantageous because particularly when the "recording" mode is started a brief check of the television program signal supplied by the tuner and consequently the television program signal available for recording is effective and desirable.

It has proved to be particularly advantageous if there has been provided a detection device which is adapted to detect the initiation a tuning operation of the tuner of the video recorder to another station by means of the mode selection device within the given time window length of the time window generated by means of the time window generator as a result of the initiation of the activation of at least one given mode of operation, and in that said detection device controls the time window generator in such a manner that the time window generator re-generates the time window of the given time window length starting from the instant at which the initiation of a tuning operation of the tuner of the video recorder to another station is detected. This is advantageous because if, after starting of the actuation of the given mode of operation, preferably the "recording" mode, it is found that unfortunately the tuner of the video recorder has not been tuned to a desired station and the tuner is subsequently tuned to another station, which is effected until the desired station is found, the television receiver is set to its second reproduction mode for the duration of the time window each time that a new tuning operation is started and, consequently, the television program signals supplied during a tuning operation can be monitored visually and acoustically.

BRIEF DESCRIPTION OF THE DRAWINGS

The invention will now be described in more detail with reference to the drawings, which show three exemplary embodiments to which the invention is not limited.

DESCRIPTION OF THE PREFERRED EMBODIMENTS

Figure 1:
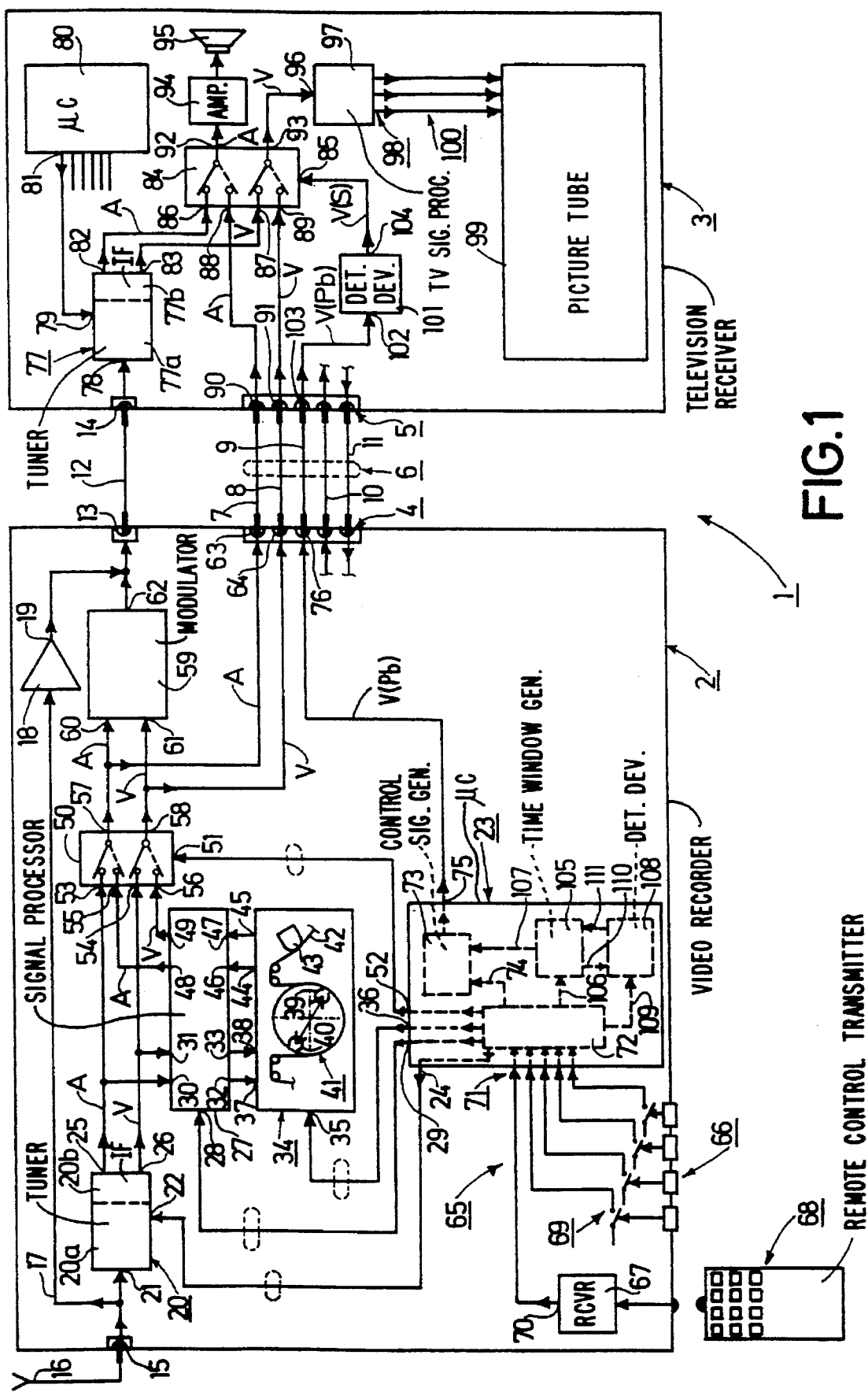
FIG. 1 shows diagrammatically a video system comprising a television receiver and a video recorder in accordance with a first embodiment of the invention, which video recorder is connected to the television receiver by a multi-core cable and comprises a control signal generator realized by means of a microcomputer, for the generation of a playback control signal, and which television receiver comprises a detection device for detecting the playback control signal.

FIG. 1 shows a video system 1 comprising a video recorder 2 in accordance with a first embodiment of the invention and a television receiver 3. The video recorder 2 and the television receiver 3 each have a connector, 4 and 5, respectively, usually referred to as SCART socket and Euro connector, respectively. The two connectors 4 and 5 are interconnected by a multi-core cable 6, of which five cores or lines 7, 8, 9, 10 and 11 are shown. The cable 6 serves for the signal transmission between the video recorder 2 and the television receiver 3, the transmission from the television receiver 3 to the video recorder 2 being possible via the line 7 for sound signals A received, demodulated and to be recorded by the video recorder 2 and via the line 8 for picture signals V received, demodulated and to be recorded by the video recorder 2. A playback control signal V(Pb), which can be generated in the video recorder 2, as will be described in detail hereinafter, can be transmitted to the television receiver 3, where the transmitted playback control signal V(Pb) can be detected by means of a detection device in the television receiver 3, as will also be described in detail hereinafter. A further signal can be transferred from the video recorder 2 to the television receiver 3 via the line 10 and another signal can be transferred from the television receiver 3 to the video recorder 2 via the line 11.

A further transmission line 12 between the video recorder 2 and the television receiver 3 serves for transmitting non-demodulated television program signals from the video recorder 2 to the television receiver 3 and is connected to a socket 13 of the video recorder 2 and to a socket 14 of the television receiver 3.

The video recorder 2 has a further socket 15, which is connected to a receiving aerial 16, or to a satellite television signal receiving device or a cable television signal receiving device, which are not shown in FIG. 1. A broadband amplifier 18 for amplifying the received and non-demodulated television signals is connected to the socket 15 via a so-called loop-through line 17. The output 19 of the amplifier 18 is connected to the socket 13.

The video recorder 2 has a circuit 20, generally referred to as front end, which comprises an electronically tunable tuner 20a, whose television signal input 21 is connected to the socket 15, and an IF section 20b, which follows the tuner 20a. The front end 20 further has a control input 22 for controlling the tuner 20a, which input can receive control signals which can be generated by a microcomputer 23 and are available on an output 24 of the latter. One of these control signals, for example, starts a successive tuning operation of the tuner 20a to different stations and another one of these control signals causes the tuner 20a to be locked to a previously tuned station. The front end 20, i.e., its IF section 20b, has a first output 25 and a second output 26. The tuner 20a of the front end 20 can be tuned to each time one station of a plurality of stations and after tuning to a station, the IF section 20b of the front end 20 supplies a received television program signal. On its first output 25, the front end 20 then supplies the demodulated sound signals A, and on its second output 26, it supplies the demodulated picture signals V.

The video recorder 2 comprises a signal processor 27, which can be switched between a recording mode and a playback mode. For switching over, the signal processor 27 comprises a control input 28 arranged to receive control signals which can be generated by the microcomputer 23 and which are available on an output 29. The signal processor 27 further has two signal inputs 30 and 31 connected to the outputs 25 and 26 of the front end 20, which inputs can receive sound signals A and picture signals V from the front end 20 for further processing, to enable these signal to be recorded. The signal processor 27 supplies the processed sound signals A and picture signals V on two outputs 32 and 33.

The processed sound signals A and picture signals V on are applied from the outputs 32 and 33 of the signal processor 27 to a recording and playback device 34. The device 34 can also be switched between a recording mode and a playback mode. For the purpose of being switched over, the device 34 has a control input 35 to which control signals can be applied, which signals can be generated by means of the microcomputer 23 and which appear on an output 36 of the latter.

The recording and playback device 34 has two inputs 37 and 38 connected to the outputs of the signal processor 27. The picture signals V to be recorded can be applied from the input 38 to two rotatable magnetic heads 39 and 40 of a drum-shaped scanning device 41 around which a magnetic tape 42 is wrapped in order to enable the picture signals V to be recorded on the magnetic tape 42 by means of the rotatable magnetic heads 39 and 40. A stationary magnetic head 43 is also in scanning contact with the magnetic tape 42, which head receives the sound signals A to be recorded and applied to the input 37, in order to record these signals on the magnetic tape 42.

The recording and playback device 34 further has two outputs 44 and 45, which receive the sound signals A reproduced by means of the magnetic head 43 and the picture signals V reproduced by means of the rotatable magnetic heads 39 and 40. From the outputs 44 and 45 of the device 34, the reproduced sound signals A and picture signals V are applied to two inputs 46 and 47 of the signal processor 27, which, after processing of the reproduced sound signals A and picture signals V, supplies these signals to two outputs 48 and 49.

The video recorder 2 comprises a switching device 50, which can be switched between a recording-mode state (solid lines) and a playback-mode state (broken lines). For switching over the switching device 50, this device has a control input 51 to which control signals can be applied, which control signals are generated by means of the microcomputer 23 and appear on an output 52 of the latter. The first output 25 and the second output 26 of the front end 20 are connected to an input 53 and an input 54 of the switching device 50. The outputs 48 and 49 of the signal processor 27 are connected to a further input 55 and a further input 56 of the switching device 50. The switching device 50 can connect either the input 53 or the further input 55 to a first output 57 of the switching device 50 and either the input 54 or the further input 56 to a second output 58 of the switching device 50. Depending on the state to which the switching device 50 has been set, either the received demodulated sound signal A to be recorded or the reproduced sound signal A appears on the first output 57 of the switching device 50. Depending on the state to which the switching device 50 has been set, either the received demodulated picture signal V to be recorded or the reproduced picture signal V appears on the second output 58 of the switching device 50.

The video recorder 2 comprises a modulator 59 having a first input 60 connected to the first output 57 of the switching device 50 and having a second input 61 connected to the second output 58 of the switching device 50. The modulator 59 can modulate the received sound signals A and picture signals V in known manner. After these signals have been modulated, the modulator 59 supplies these signals to its output 62, which is connected to the socket 13.

The first output 57 of the switching device 50 is further connected to a terminal 63 of the connector 4 and the second output 58 of the switching device 50 is connected to a terminal 64 of the connector 4.

To start its modes of operation, the video recorder 2 comprises a mode selection device 65 realized by means of the microcomputer 23. The mode selection device 65 comprises a set 66 of keys provided on the video recorder 2. The mode selection device 65 further comprises a remote control receiver 67 which can receive remote control signals supplied by a remote control transmitter of a remote control device 68. The switching contacts 69 of the keys of the set 66 of keys and the output 70 of the remote control receiver 67 are connected to inputs 71 of the microcomputer 23. A device 72, shown diagrammatically in broken lines, for processing the switching commands applied to the inputs of the microcomputer 23 is implemented by means of this microcomputer 23. The device 72 can generate control signals for controlling parts of the video recorder 2. On the outputs 24, 29, 36 and 52 the device 72 produces the control signals for controlling the tuner 20a and for switching the signal processor 27 and the recording and playback device 34 between their recording modes and their playback modes and the switching device 50 between its recording-mode state and its playback-mode state.

The video recorder 2 has a control signal generator 73 which, in the present case, is also implemented by means of the microcomputer 23. However, this control signal generator 73 can also be implemented as a separate device without the use of the microcomputer 23. The control signal generator 73, as is shown diagrammatically by a broken line 74, can be controlled by the device 72 for processing the applied switching commands and supplying control signals, in such a manner that the control signal generator 73 is activated and supplies a playback control signal V(Pb) when the video recorder 2 is in the "playback" mode. This playback control signal V(Pb) is a direct voltage which can lie within two ranges of high-level levels, i.e. between 5 and 7 V or between 9.5 and 12 V. With the control signal generator 73 deactivated, this generator will supply a direct voltage in a range of low-level values between zero and 2.5 V. The control signal generator 73 supplies the playback control signal V(Pb) to an output 75 of the microcomputer 23. The playback control signal V(Pb) can be applied to the connector 4 of the video recorder 2 simultaneously with a television program signal reproduced in the "playback" mode in the video recorder 2, which playback control signal V(Pb) is applied to a terminal 76 of the connector 4.

The television receiver 3 of the video system 1 shown in FIG. 1 also has a circuit 77 generally referred to as a front end, which comprises an electronically tunable tuner 77a, having an input 78 is connected to the socket 14 of the television receiver 3, and an IF section 77b following the tuner 77a. The front end 77 has a control input 79 for controlling the tuner 77a, which input can receive control signals which can be generated by a microcomputer 80 of the television receiver 3 and are available on an output 24 of this microcomputer. One of these control signals starts a successive tuning operation of the tuner 77a to different stations and another one of these control signals causes the tuner 77a to be locked to a previously tuned station. The front end 77, i.e. its IF section 77b, has a first output 82 and a second output 83. The tuner 77a of the front end 77 can be tuned to each time one station of a plurality of stations, and after tuning to a station, the IF section 77b of the front end 77 supplies a received television program signal, the front end 77 then supplying the demodulated sound signals A on its first output 82 and the demodulated picture signals V on its second output 83.

The television receiver 3 comprises a switching device 84, which can be switched between a first reproduction-mode state (solid lines) and a second reproduction-mode state (broken lines). For switching over the switching device 84, this device has a control input 85 to which a control signal V(S) can be applied to switch over the switching device 84. The generation of the control signal V(S) will be described in detail hereinafter. The first reproduction-mode state of the switching device 84 corresponds to a first reproduction mode of the television receiver 3, in which the picture signals V and sound signals A supplied by its front end 77 are reproduced. The second reproduction-mode state of the switching device 84 corresponds to a second reproduction mode of the television receiver 3, in which the television receiver 3 reproduces the picture signals V and sound signals A supplied by the video recorder 2 via the connector 5.

The switching device 84 has two inputs 86 and 87 connected to the first output 82 and the second output 83 of the front end 77. The switching device 84 further has a further input 88 and a further input 89, the further input 88 being connected to a terminal 90 of the connector 5 and the further input 89 being connected to a terminal 91 of the connector 5. In the first reproduction-mode state of the switching device 84, the inputs 86 and 87 of the switching device 84 are connected to the two outputs 92 and 93 of the switching device 84. The output 92 of the switching device 84 is connected to a sound amplifier 94, which drives a loudspeaker 95 for the acoustic reproduction of the sound signals. The output 93 of the switching device 84 is connected to an input 96 of a television signal processor 97 which supplies signals for driving a picture tube 99 of the television receiver 3 at its outputs 98, of which three outputs are shown in FIG. 1, which signals are applied to the picture tube 99 via lines 100.

When the switching device 84 is in its first reproduction-mode state, the sound signals A and picture signals V supplied by the front end 77 of the television receiver 3 are reproduced by means of the loudspeaker 95 and the picture tube 99, respectively. When the switching device 84 is in its second reproduction-mode state, the sound signals A and picture signals V at the outputs 57 and 58 of the switching device 50 of the video recorder 2, which are applied to the switching device 84 of the television receiver 3 via the connector 4 of the video recorder 2, the cabling 6 and the connector 5 of the television receiver 3, are reproduced by means of the loudspeaker 95 and the picture tube 99, respectively, of the television receiver 3.

The television receiver 3 comprises a detection device 101 which has been provided and constructed to detect the playback control signal V(Pb) generated and supplied by the control signal generator 73 of the video recorder 2. For this purpose, an input 102 of the detection device 101 is connected to a terminal 103 of the connector 5 of the television receiver 3. The terminal 103 of the connector 5 is connected to the terminal 76 of the connector 4 of the video recorder 2 via the line 9 of the cable 6, which terminal 76 receives the playback control signal V(Pb) from the output 75 of the microcomputer 23. The detection device 101 is constructed as a direct voltage detector and supplies at its output 104 the control signal V(S) for the time during which a playback control signal V(Pb) is applied to its input 102. The output 104 of the detection device 101 is then connected to the control input 85 of the switching device 84. As soon as the detection device 101 supplies the control signal V(S) to the control input 85 of the switching device 84 via the output 104, the switching device 84 is changed over to its second reproduction-mode state (broken lines). As soon as the control signal V(S) disappears or as long as no control signal V(S) appears the switching device 84 remains in its first reproduction-mode state (solid lines).

In the present video system 1, shown in FIG. 1 the video recorder 2 has a time window generator 105 for generating a time window of a given time window length T. The time window generator 105, like the device 72 for processing the applied switching commands and supplying the control signals and like the control signal generator 73, is implemented by means of the microcomputer 23. However, alternatively, the time window generator 105 can be constructed as a separate device without the use of the microcomputer 23. The time window generator 105 can be controlled by the mode selection device 65, i.e., in the present case by the device 72 for processing the applied switching commands and supplying the control signals, as indicated by a broken line in FIG. 1, which device 72 forms part of the mode selection device 65. The time window generator 105 is controlled by the mode selection device 65 in such a manner that the time window generator 105 generates the time window of the given time window length T at least one time as a result of start of the actuation of at least one given mode which deviates from the "playback" mode and which can be activated by means of the mode selection device 65.

In the video recorder 2 of the video system 1, shown in FIG. 1 the time window generator 105 controls the control signal generator 73, as is indicated by a broken line 107 in FIG. 1. The control signal generator 73 is controlled by the time window generator 105 in such a manner that the control signal generator 73 also generates and supplies the playback control signal V(Pb) if the time window generator 105 generates the time window of the given time window length T.

In the video recorder 2 of the video system 1, shown in FIG. 1 the arrangement is such that the mode selection device 65, i.e., its device 72, is responsive to the start of the actuation of the "recording" mode activates the time window generator 105 to generate the time window of the time window length T, as will be described in detail with reference to FIG. 2.

The video recorder 2 of the video system 1, shown in FIG. 1 further comprises a detection device 108, which in the present case is also implemented by means of the microcomputer 23. The device 72 for processing the applied switching commands and supplying the control signals can supply information to the detection device 108 to indicate that a tuning operation of the tuner 20a of the video recorder 2 to another station by means of the mode selection device 65 has started, as indicated by a broken line 109 in FIG. 1. Moreover, the time window generator 105 can supply information to the detection device 108 to inform the detection device 108 that the generation of a time window has started, as indicated by a broken line 110 in FIG. 1. By means of the detection device 108, it is possible to detect that a tuning operation of the tuner 20a of the video recorder 2 to another station by means of the mode selection device 65 has started within the given time window length T of the time window generated by means of the time window generator 105 as a result of the start of the activation of the at least one given mode, i.e., the "recording" mode.

The detection device 108 controls the time window generator 105, as shown diagrammatically by means of a broken line 111. This is effected in such a manner that the time window generator 105 generates the time window of the given length T starting from the instant at which the start of a tuning operation of the tuner 20a of the video recorder 2 to another station is detected.

Figure 3:
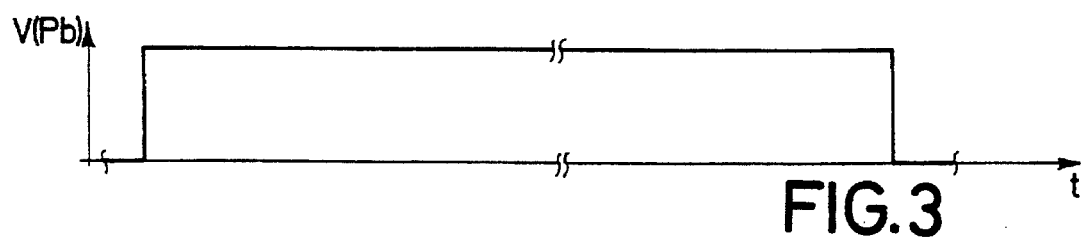
FIG. 3 shows a playback control signal supplied by the control signal generator if the video recorder of the video system shown in FIG. 1 is set to the "playback" mode.

If the video recorder 2 of the video system 1 shown in FIG. 1 is set to the "playback" mode by means of the mode selection device 65, the device 72 for processing the applied switching commands and supplying the control signals then actuates the control signal generator 73, as a result of which the control signal generator 73 supplies the playback control signal V(Pb) for the time during which the video recorder 2 is in the "playback" mode, as is shown in FIG. 3. This playback control signal V(Pb) is applied from the output 75 of the microcomputer 23 to the input 102 of the detection device 101 via the terminal 76 of the connector 4 of the video recorder 2, the line 9 of the cable 6, and the terminal 103 of the connector 5 of the television receiver 3. Subsequently, the detection device 101 supplies the control signal V(S) to the control input 85 of the switching device 84 for the time during which the playback control signal V(Pb) is available, so that the switching device 84 is set to its second reproduction-mode state, in which the further inputs 88 and 89 are connected to the outputs 92 and 93 of the switching device 84. As result, the sound signals A and the picture signals V supplied to the outputs 57 and 58 of the switching device 50 of the video recorder 2 are reproduced by means of the television receiver 3. Since, as already stated, the video recorder 2 is in the "playback" mode these sound signals A and picture signals V are sound and picture signals reproduced from the magnetic tape 42 by means of the recording and playback device 34 and processed by means of the signal processor 27. The playback control signal V(Pb) thus automatically sets the television receiver 3 to the second reproduction mode, in which the sound signals A and picture signals V recovered by means of the video recorder 2 in the case just described are reproduced.

Hereinafter, a program is described by means of a flowchart shown in FIG. 2, which program is carried out in the microcomputer 23 of the video recorder 2 to generate the playback control signal V(Pb) shown in FIG. 4 when the video recorder 2 is set to the "recording" mode, in order to achieve that the sound signals A and picture signals V to be recorded by the video recorder 2 are briefly reproduced by means of the television receiver 3 for acoustically and optically monitoring the sound signals A and picture signals V to be recorded.

Figure 2:
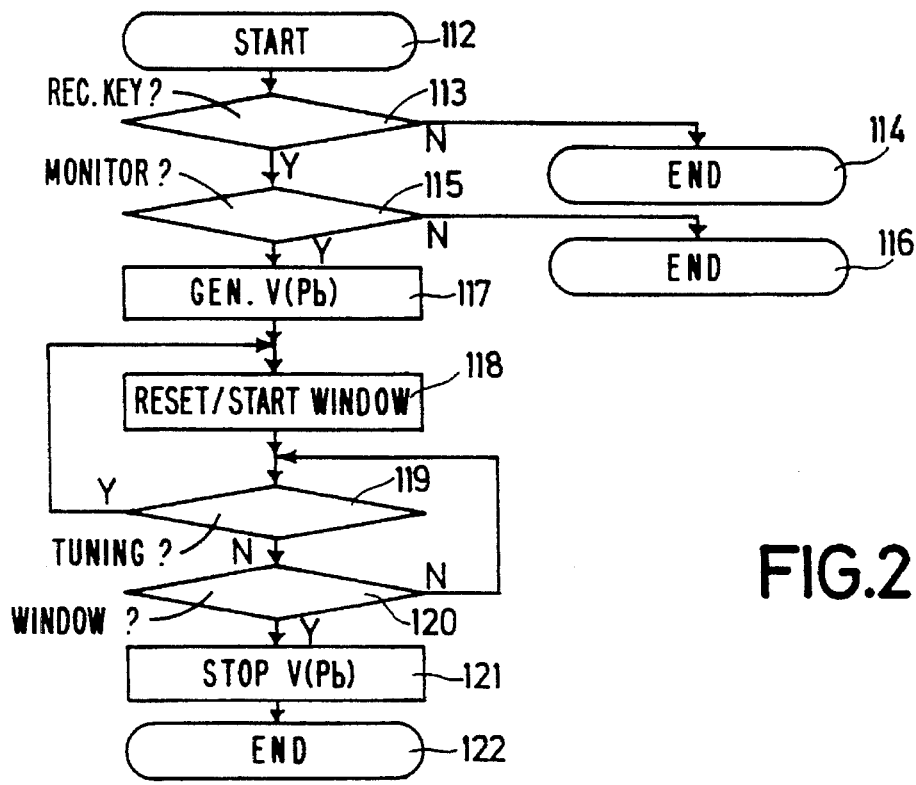
FIG. 2 is a flowchart of a program performed in the microcomputer of the video recorder of the video system shown in FIG. 1 in order to generate a playback control signal.

The program corresponding to the flowchart shown in FIG. 2 is started in block 112. In block 113, it is subsequently ascertained whether the key for starting the "recording" mode on the remote control device 68 or on the video recorder 2 has been actuated. If this is not the case, the program is terminated in block 114, to proceed to another program. However, if in block 113 it is found that the key for starting the "recording" mode has been actuated, it is subsequently tested in block 115 whether previously a deliberate control command for starting the desired monitoring function of the received television program signal to be recorded has been given. Such a control command can be obtained, for example, by actuation of a separate key for the selection of this monitoring function. This monitoring function may be referred to by the acronym "SWYR", which means "See what you receive and record". If the test in block 115 is negative, the program is terminated in block 116. Conversely, if the test in block 115 is positive the program proceeds to block 117. In block 117 the control signal generator 73 is activated, i.e., the supply of a d.c. control voltage V(Pb) at an instant $t_0$ is initiated. Subsequently, the time window generator 105, formed by an internal timer of the microcomputer, is reset and started in block 118. After this, the detection device 108 is activated in block 119, in such a manner that in this block 119, it is checked whether the user of the video recorder 2 has carried out a deliberate operation, specifically the actuation of a key to start the process of tuning the tuner 20a of the video recorder 2 to another station. For the time being, it is now assumed that such a deliberate actuation of a key has not taken place. The program then proceeds to block 120, in which it is checked whether the timer forming the time window generator 105 has already reached or exceeded a given numerical value or time value corresponding to the desired time window length T. If this is not the case, the program returns to block 119. However, if in block 120 it is found that the desired time window length T has already been reached, the control signal generator 73 is subsequently deactivated in block 121, i.e., the generation of the playback control signal V(Pb) is terminated after expiration of the time window length T at an instant $t_1$. After this, the program is stopped in block 122.

Figure 4:
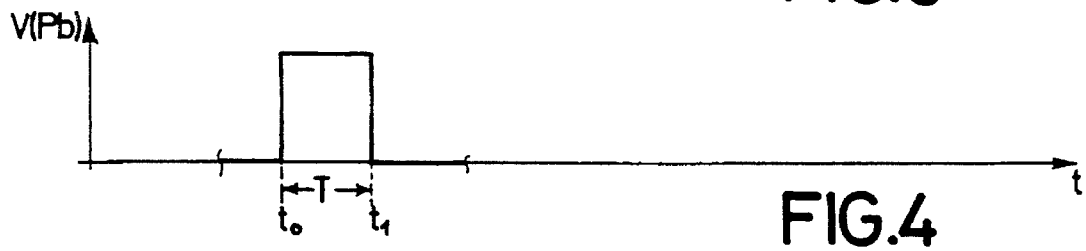
FIG. 4 shows a playback control signal supplied by the control signal generator of the video recorder of the video system shown in FIG. 1 if the control signal generator is actuated by a time window generator, which is also realized by the microcomputer, for the generation of a time window having a given time window length.

When the program described above is carried out, the playback control signal V(Pb) shown in FIG. 4 is generated. The generation of this playback control signal V(Pb) is initiated by setting the video recorder 2 to the "recording" mode and, as a result of this, the television receiver 3 in which the playback control signal V(Pb) is detected by means of the detector 101 is set to its second reproduction mode for the time during which this playback control signal V(Pb) occurs, in which mode in the case just described the sound signals A and picture signals V to be recorded and supplied to the signal processor 27 and the switching device 50 by the front end 20 of the video recorder 2 are reproduced acoustically and optically for monitoring purposes.

Figure 5:
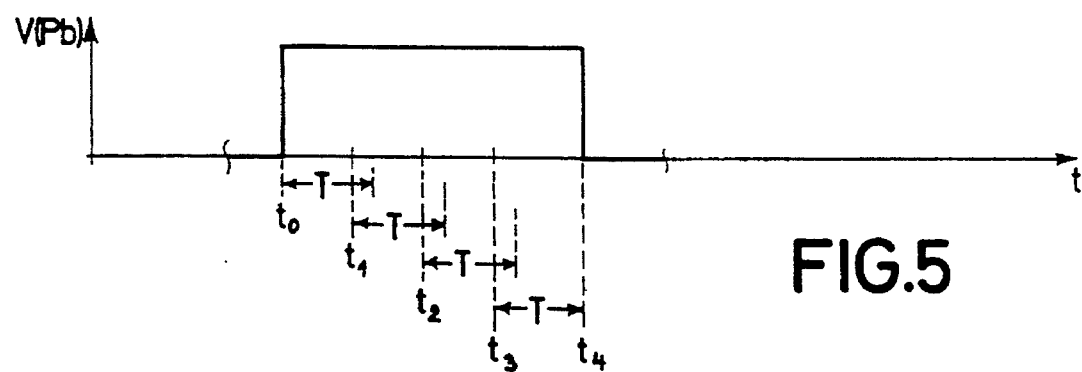
FIG. 5 shows a playback control signal supplied by the control signal generator of the video recorder of the video system shown in FIG. 1 if the control signal generator is actuated by a time window generator and if a tuning operation for tuning a tuner of the video recorder to another station is started three times within the time window length of the time window generated by the time window generator.

If, in block 119 of the program described with reference to the flowchart in FIG. 2, it is found after the start of the time window generator 105 initiated in block 118—after which the television receiver 3 then already reproduces the sound signals A and picture signals V to be recorded in the video recorder 2—that the user of the video recorder 2 has deliberately actuated a key to tune the tuner 20a of the video recorder 2 to another station within the given time window length T, in order to enable another television program signal to be received and recorded by means of the video recorder 2, the program is not started in block 120 but is re-started in block 118, which means that as a result of the deliberate initiation of a tuning process of the tuner 20a of the video recorder 2 within the time window, the time window generator 105 is reset and started again, as indicated for the instant $t_1$ in FIG. 5. If in such case, when the block 119 is reached again, it is again found that a tuning operation of the tuner 20a of the video recorder 2 has again been started deliberately within the time window, for example, at the instant $t_2$, this will again result in the program proceeding to block 118, as indicated for the instant $t_2$ in FIG. 2. FIG. 5 shows a playback control signal V(Pb) in the ease that after the first activation of the time Window generator 105, the user of the video recorder 2, by actuation of the key for starting the "recording" mode, has three times deliberately initiated a tuning operation of the tuner 20a of the video recorder 2 within the previously started time window, i.e., at the instants $t_1$, $t_2$ and $t_3$. As a result, the generation of the playback control signal V(Pb) is not terminated until an instant $t_4$, so that the sound signals A and picture signals V supplied by the front end 20 of the video recorder 2 are monitored for a desired longer time interval by the television receiver 3 connected to the video recorder 2.

Figure 6:
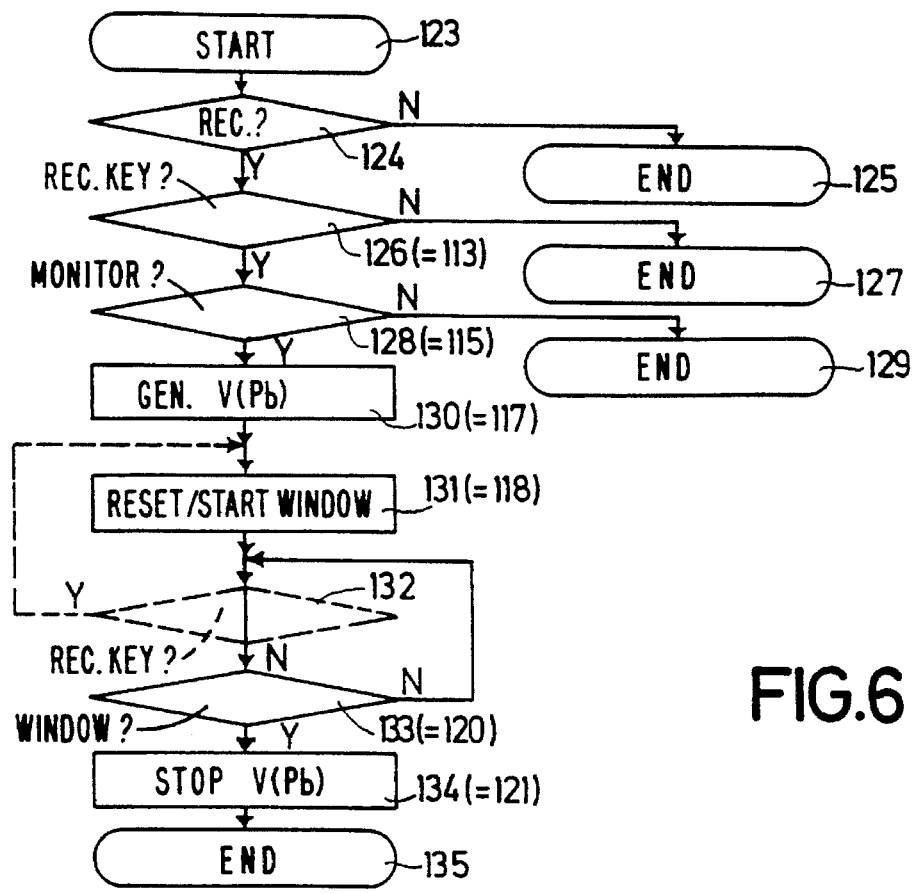
FIG. 6 is a flowchart of a program performed in the microcomputer of the video recorder in a second embodiment of the invention in order to generate a playback control signal.

With reference to the flowchart in FIG. 6, a program is described which is carried out in a microcomputer of a video recorder 2 in accordance with a second embodiment of the invention, in order to ensure that the sound signals A and picture signals V of a television program signal to be recorded are not yet monitored by a television receiver 3 connected to the video recorder 2 when the "recording" mode is selected but that the sound signals A and picture signals V to be recorded are monitored when the video recorder 2 has been in the "recording" mode for a longer time, so that it is simply possible to ascertain whether the desired television program signal is still being recorded or, for whatever reason, the desired television program signal to be recorded has already ceased or in the meantime has been replaced by another television program signal.

The program in accordance with FIG. 6 is started in block 123. In block 124 it is checked whether the video recorder 2 has already been set to the "recording" mode. If this is not the case the program is terminated in block 125. However, if in block 124 it is found that the "recording" mode has already been selected, the program proceeds to block 126 in which, in the same way as in block 113 in FIG. 2, it is tested whether the key for selecting the "recording" mode has been actuated. If this is not case, the program is stopped in block 127. Conversely, if said key has been actuated, it is checked in block 128, in the same way as in block 115 in FIG. 2, whether previously the "SWYR" function (See what you receive and record) has been activated deliberately. If this is not the case, the program is terminated in block 129. However, if said function has been activated, the program proceeds to block 130, where the same steps are performed as in block 117 in FIG. 2. Subsequently, in block 131, the same operations are carried out as in block 118 in FIG. 2. After this, the program proceeds to block 133, where the same operations are carried out as in block 120 in FIG. 2. Then the program proceeds to block 134, where the same operations are carried out as in block 121 in FIG. 2. Subsequently, the program is terminated in block 135. When this program is carried out, it is achieved that if the video recorder 2 is already in the "recording" mode and the key for selecting the "recording" mode is deliberately actuated once more, the playback control signal V(Pb) is generated for the duration of the time window length T, so that during this time interval monitoring is effected on a television receiver 3 connected to the video recorder 2.

The program in accordance with FIG. 6 can be modified in that the block 131 is followed by a block 132 in which it is checked whether the key for selection of the "recording" mode has been actuated deliberately one more time. If this is the case, the program returns to block 131, which corresponds to block 114 in FIG. 2, as a result of which the time window generator 105 is re-started. Thus, by a repeated actuation of the key for selection of the "recording" mode after the time window generator 105 has been started, it is possible to prolong the generation of the time window in order to achieve monitoring on the television receiver 3 for a time desired by the user of the video recorder 2.

Figure 7:
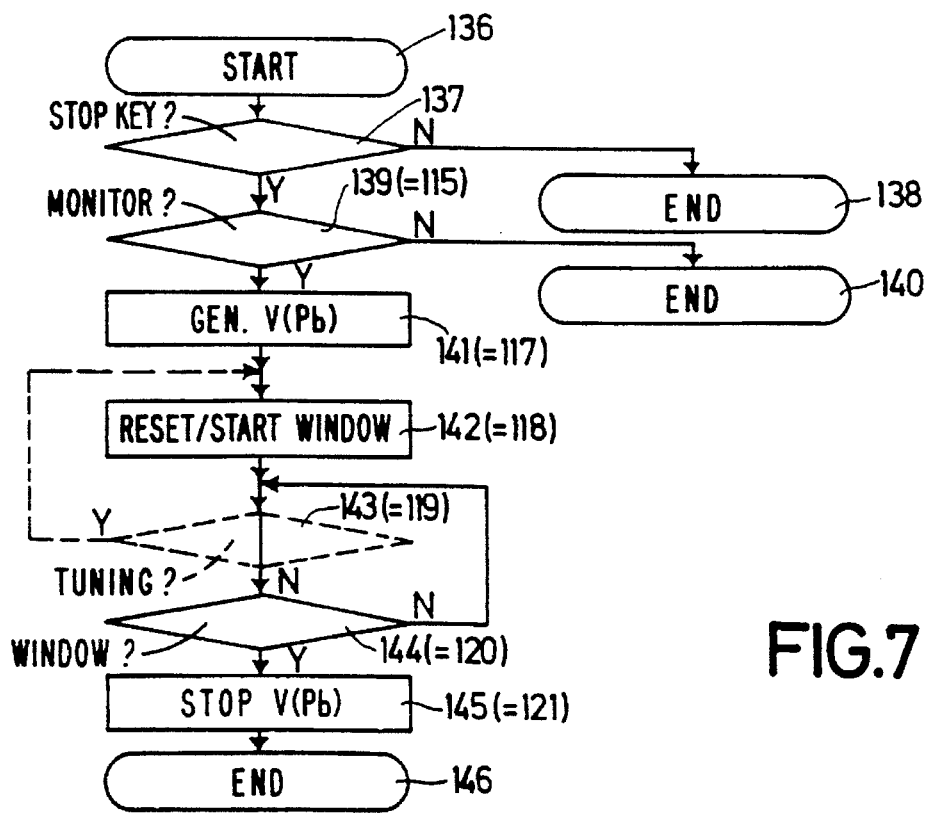
FIG. 7 is a flowchart of a program performed in the microcomputer of the video recorder in a third embodiment of the invention in order to generate a playback control signal.

With reference to the flowchart in FIG. 7, a program is described which is carried out in a microcomputer of a video recorder 2 in accordance with a third embodiment of the invention. By actuation of the "stop" key of the video recorder 2 when the video recorder 2 is in the "stand-by" mode, this program enables monitoring by means of a television receiver 3 connected to the video recorder 2, during which monitoring the sound signals A and picture signals B supplied by the front end 20 of the video recorder 2 are reproduced acoustically and optically without these signals being recorded in the video recorder 2.

The program in accordance with FIG. 7 is started in block 136. Subsequently, in block 137 it is checked whether the "stop" key of the video recorder 2 has been actuated. If this is not the case the program is terminated in block 138. Conversely, if said key has been actuated, it is checked in block 139 whether previously the "SWYR" function (See what you receive and record) has been activated deliberately by the user of the video recorder 2. This may be effected, for example, by the actuation of a separate "SWYR" key. In the case of a negative test result in block 139, the program proceeds to block 140, where it is stopped. In the case of a positive test result in block 139, the program proceeds to block 141, in which the same operations as in block 117 in FIG. 2 are performed. After this, the program is continued in block 142, in which the same operations as in block 118 in FIG. 2 are carried out. Subsequently, the program can proceed to block 143, in which the same operations as in block 119 in FIG. 2 are performed. Now, the program proceeds to block 144, in which the same operations as in block 120 in FIG. 2 are performed. Subsequently, the program is continued in block 145, in which the same operations as in block 121 in FIG. 2 are performed. Finally, the program in accordance with FIG. 7 is terminated in block 146.

By means of this program, it is achieved that by actuation of the "stop" key of the video recorder 2 the sound signals and picture signals supplied by the front end of the video recorder are briefly monitored by a television receiver connected to the video recorder.

In all the video recorders in accordance with the embodiments described hereinbefore, it is achieved in a particularly simple manner that by merely initiating the activation of a given mode, the playback control signal, which is generated for a given time interval by the control signal generator of the relevant video recorder, is supplied to a television receiver connected to the video recorder during this given time interval, so that the television receiver is set to its second reproduction mode and, consequently, the television program signal, which is supplied by the front end of the video recorder and is applied to the television receiver via the connector of the video recorder, the cabling and the connector of the television receiver, is monitored partly on the display screen and partly by a loudspeaker of the television receiver, thereby enabling this television program signal to be checked visually and acoustically.

In the case of a video recorder in accordance with the invention which also comprises a text signal generator a text, such as, for example, "This program is being recorded" or "This program is being received", may be displayed on the display screen of a television receiver during monitoring in accordance with the invention by means of this television receiver. The text signal for such an inserted text is then generated by the text signal generator of the video recorder and is inserted into the picture signal which is transferred from the video recorder to the television receiver for monitoring purposes.

I claim:

1. A video recorder comprising:

a tuner for tuning to, each time, one station of a plurality of stations and, after having been tuned to a station, for supplying a first received television program signal;

a recording and playback device for recording said first received television program signal supplied by the tuner and for reproducing a recorded television program signal;

a first connector connectable to the tuner for receiving the first received television program signal supplied by the tuner, a cable being connectable to said first connector, said cable also being connectable to a second connector of a television receiver, said television receiver also having a tuner for tuning to, each time, one station of a plurality of stations and, after having been tuned to a station, for supplying a second received television program signal which is reproduced by the television receiver in a first reproduction mode thereof, said cable enabling signals to be transferred both from and to the video recorder;

a mode selection device for selectively setting the video recorder to a "recording" mode, in which said first received television program signal supplied by the tuner is recorded, to a "playback" mode, in which a recorded television program signal is reproduced, and to further modes of operation; and a control signal generator for generating and supplying a playback control signal (V(Pb)) when the video recorder is in the "playback" mode, said playback control signal together with a television program signal reproduced in the "playback" mode in the video recorder being applicable to the first connector, the playback control signal (V(Pb)) thereafter being applicable to a detection device of the television receiver via the cable and the second connector, said detection device being adapted to detect the playback control signal (V(Pb)), whereby, in said television receiver, a second reproduction mode is selectively started upon detection of the playback control signal (V(Pb)) to reproduce the television program signal transferred to the television receiver via the cable, characterized in that the video recorder further comprises a time window generator for generating a time window of a given time window length (T), and in that the mode selection device controls the time window generator in such a manner that the time window generator generates the time window of the given time window length (T) at least one time as a result of an initiation of the activation of at least one given mode which deviates from the "playback" mode and which is activatable by the mode selection device, and in that the time window generator controls the control signal generator in such a manner that the control signal generator also generates and supplies the playback control signal (V(Pb)) if the time window generator generates the time window.

2. A video recorder as claimed in claim 1, characterized in that in response to the initiation of the activation of the "recording" mode the mode selection device activates the time window generator to generate the time window.

3. A video recorder as claimed in claim 1, characterized in that said video recorder further comprises a detection device for detecting an initiation a tuning operation of the tuner of the video recorder to another station by the mode selection device within the given time window length (T) of the time window generated by the time window generator as a result of the initiation of the activation of said at least one given mode of operation, said detection device controlling the time window generator in such a manner that the time window generator regenerates the time window of the given time window length (T) starting from the instant at which the initiation of a tuning operation of the tuner of the video recorder to another station is detected.

4. A video recorder as claimed in claim 2, characterized in that said video recorder further comprises a detection device for detecting an initiation a tuning operation of the tuner of the video recorder to another station by the mode selection device within the given time window length (T) of the time window generated by the time window generator as a result of the initiation of the activation of said at least one given mode of operation, said detection device controlling the time window generator in such a manner that the time window generator regenerates the time window of the given time window length (T) starting from the instant at which the initiation of a tuning operation of the tuner of the video recorder to another station is detected.

* * * * *